March 10, 1953     D. F. SHERMAN     2,630,670
MOWING MACHINE SICKLE BAR DRIVING MEANS
Filed Nov. 3, 1950     2 SHEETS—SHEET 1
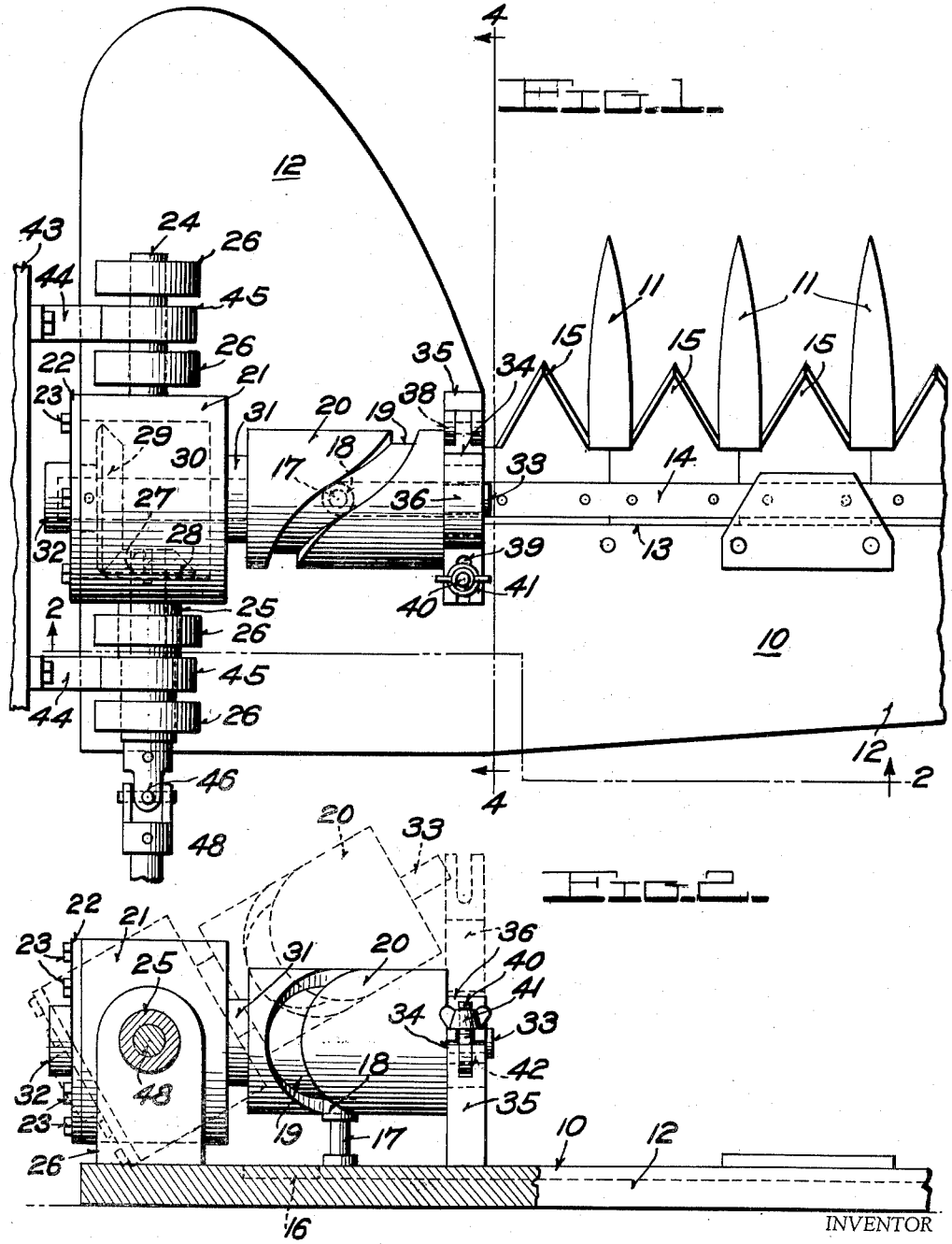
INVENTOR
DELMER F. SHERMAN,
BY H. B. Willson & Co.
ATTORNEYS March 10, 1953 D. F. SHERMAN 2,630,670
MOWING MACHINE SICKLE BAR DRIVING MEANS
Filed Nov. 3, 1950 2 SHEETS—SHEET 2
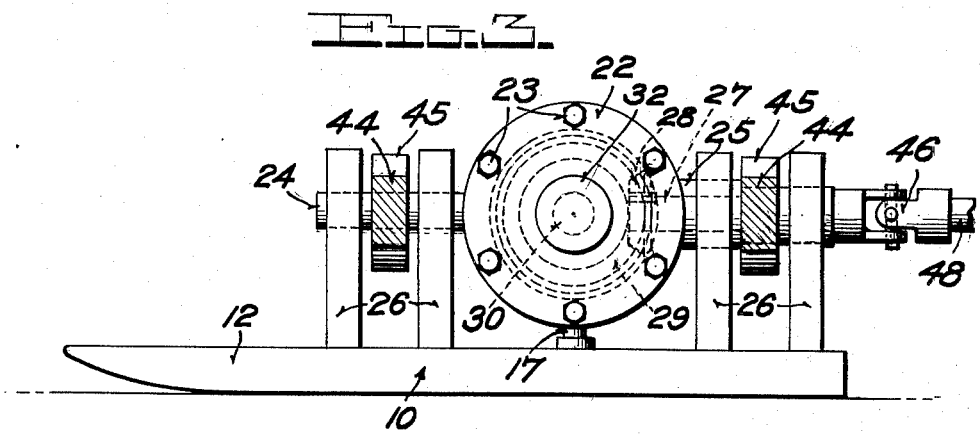
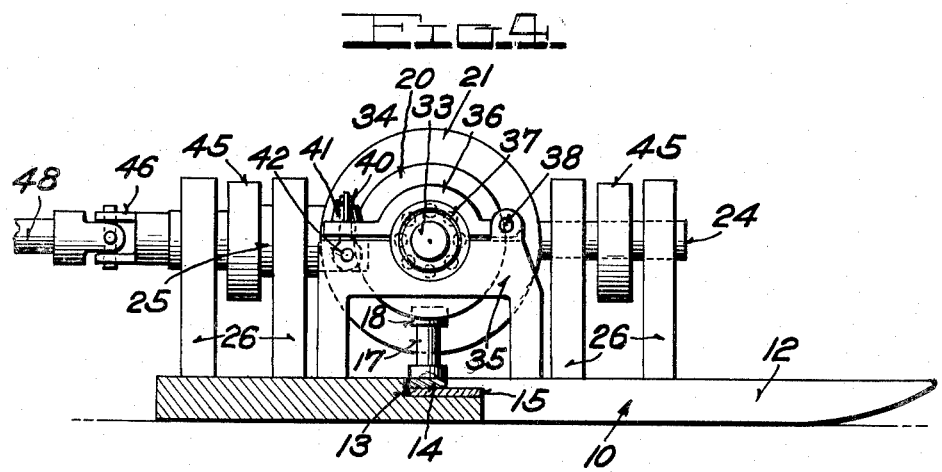
INVENTOR
DELMER F. SHERMAN,
BY H.B.Willson&Co.
ATTORNEYS Patented Mar. 10, 1953

2,630,670

UNITED STATES PATENT OFFICE 2,630,670

MOWING MACHINE SICKLE BAR DRIVING MEANS

Delmer F. Sherman, New Plymouth, Idaho

Application November 3, 1950, Serial No. 193,871

7 Claims. (Cl. 56—296)

My invention relates to mowing machines, and more particularly to sickle bar driving means therefore.

It is well known that the pitman usually used to reciprocate the cutter or sickle bar produces an up and down slapping of the sickle head resulting in a racking of the machine and at times causing the sickle head to jerk loose when mowing heavy hay. While it has been proposed to drive the cutter bar by providing it with a pin or stud to travel in a diagonal cam groove in a drum or cylinder rotated by a suitably driven shaft, most mowers still have the usual pitman drive.

One object of the invention is to provide a "rotary pitman" drive of the above indicated character in which the rotary driving cam member will be positioned directly over a pin or stud on the top of the inner end of the reicprocatory bar carrying the cutter blades in order to produce a very simple and practical as well as highly effective means for moving the sickle bar back and forth with a smooth and even motion, thus overcoming the objections to the old "reciprocatory pitman."

Another object of the invention is to provide a drive of the above indicated character so constructed that the sickle bar may be released or disconnected from the rotary driving member without the use of a wrench or other tool so that the cutter bar may be quickly and easily removed from the mower for sharpening or other repairs.

A further object is to provide the finger bar at one end with a fixed shoe on which the gear housing is directly mounted and which is pivoted on the drive shaft.

With the above and other objects and advantages in view, the invention resides in the novel combinations and arrangements of parts and in the novel features of construction hereinafter described and claimed, and illustrated in the accompanying drawings in which:

Fig. 1 is a top plan view of a portion of a mower showing my improved cutter bar mounting and driving means, parts of the mowing machine being conveniently illustrated and parts being broken away;

Fig. 2 is a vertical section taken approximately on the plane of the line 2—2 of Fig. 1;

Fig. 3 is a detail end elevation looking toward the inner end of the mechanism, parts being broken away and in section;

Fig. 4 is a vertical cross section taken approximately on the line 4—4 of Fig. 1.

Referring more in detail to the drawings, the numeral 10 denotes a finger bar having the usual fingers 11 and projecting outwardly from an inner shoe 12. Formed in the top of the finger bar is a groove or guide-way 13 in which is mounted for reciprocation a cutter or sickle bar 14 to which the usual cutter blades 15 are secured. A portion 16 of the guide-way 13 extends into the shoe to receive the inner end or head of the sickle bar 14 and fixed to said head is an upwardly projecting pin or stud 17 carrying at its top a roller 18, ball bearings (not shown) being preferably provided between the roller and stud. The roller projects into a continuous cam groove 19 formed in the periphery of a rotary driving cylinder 20 disposed horizontally and positioned vertically above the inner end of the cutter bar 14. The diagonal or spiral arrangement of the cam groove causes the cutter bar to be reciprocated when the cylinder is rotated.

For the purpose of driving the cam cylinder and mounting it so that it may be lifted from engagement with the stud carried roller 18, I mount on the inner portion of the shoe 12 a swingable gear housing or casing 21. The latter is pivotally mounted on a horizontal axis which extends in a forward and rearward direction or transversely of the cutter bar, so that the cylinder may be swung upwardly and inwardly as shown in dotted lines in Fig. 2. The body of the housing 21 may be of cylindrical shape and have its inner open end closed by a cover plate 22 removably fastened by machine screws or bolts 23. Formed on the forward side of the housing is an integral journal stud 24 while from its rear side projects a tubular journal stud 25 which is coaxial with the stud 24. The journals 24, 25 are mounted in bearing posts 26 formed on or suitably secured to the shoe 12. Extending through and rotatable in the tubular journal 25 is a shaft 27. On the inner end of the latter is a beveled gear or pinion 28 which meshes with a larger beveled gear 29 fixed to a shaft 30 to which the cylinder 20 is fastened or which may be integral with one end of the cylinder. The shaft 30 extends outwardly from the housing 21 through a bearing hub or boss 31 and its inner end is rotatable in a bearing socket in a boss 32 formed on the cover plate 22 as seen in Fig. 1. When the cam cylinder 20 is keyed or otherwise secured to the shaft 30 its outer end 33 projects beyond the outer end of the cylinder but the end 33 may be an integral stub shaft formed on the cylinder in axial alinement with the shaft 30.

The shaft end 33 is mounted for rotation in a quick-releasable bearing generally indicated at 34, such bearing holding the pivoted gear housing stationary when the roller 18 is engaged in the cam groove 19. The bearing 34, as seen in Fig. 4, comprises a stationary lower section 35 and a movable upper section 36 with a suitable ball-bearing or other anti-friction bearing 37 between them. The fixed lower section 35 is in the form of an inverted U-shaped bracket suitably fixed to the shoe 12 so as to straddle the inner end of the cutter bar. The quick-releasable upper section 36 has one end pivotally mounted at 38 on a pin between spaced ears at one end of the fixed section. The other end of the section 36 is formed with a longitudinal slot 39 adapted to receive the screw threaded end of a bolt 40 carrying a wing nut 41. The bolt 40 may be an eye-bolt pivoted at 42 in a recess in the fixed section 35. The opposed faces of the two sections have seats to receive and clamp the ball-bearing unit 37 when the nut 41 is tightened. It will be seen that when the section 36 is released and swung upwardly on its pivot 38, the cam cylinder may be swung upwardly on the pivotal axis of the gear housing 21 to release the cam follower or roller on the cutter bar so that the latter may be readily removed for sharpening or repairs.

Since the outer end of the sickle must be swung upwardly to avoid stationary objects in its path and to facilitate passage of the mower through gate openings, I preferably pivotally mount the shoe 12 on the mower by extending the journal studs 24 and 25 beyond the bearings 26 so that they may be rotatable in suitable supporting bearings carried by the frame of the mower. In Fig. 1 a portion of the frame of the mower is shown at 43 and to it may be suitably secured bearing brackets or arms 44 having bearings 45 which receive the extended portions of the journals 24, 25; or the bearings 45 may be connected by an arched member suitably secured to the mower frame.

The mechanism is preferably driven from the power take-off of a tractor and the cutter may be positioned either in front of or in rear of the tractor wheels. The shaft 27 may therefore extend either forwardly or rearwardly from the gear housing 21, and may be connected to the power take-off in any desired manner. As shown there is a universal joint 46 between the rear end of shaft 27 and a drive shaft 48 which may be an extensible shaft driven by a V-belt drive from the power take-off, or in any other manner.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a mowing machine, a finger bar having a shoe at its inner end and a longitudinal guide-way in its top, said guide-way extending into and transversely of said shoe, a cutter bar reciprocable in said guide-way and having an upstanding stud at its inner end, a gear housing, means pivotally mounting said housing on said shoe on a forwardly and rearwardly extending horizontal axis, said means including coaxially alined journals projecting from opposite sides of said housing and bearings for said journals mounted on said shoe, a first shaft journaled in said housing and projecting from the outerside thereof, a cylinder fixed to the projecting portion of said shaft and disposed vertically above the inner portion of said cutter bar, said cylinder having in its periphery a continuous cam groove to receive said stud, a second shaft journaled in said housing coaxially with the pivotal axis of the latter, a driving shaft flexibly connected to the outer end of said second shaft, gearing in said housing connecting said shafts, and a two-part bearing on said shoe to journal the end of said first shaft projecting beyond said cylinder, said two-part bearing having a fixed lower section and a quick-releasable upper section, which when released permits said cylinder and its shaft to swing upwardly on the pivotal axis of said housing.

2. In a mowing machine, a finger bar having a shoe at its inner end and a longitudinal guide-way in its top, said guide-way extending into and transversely of said shoe, a cutter bar reciprocable in said guide-way and having an upstanding stud at its inner end, a gear housing pivotally mounted on said shoe on a forwardly and rearwardly extending horizontal axis, a first shaft journaled in said housing and projecting from the outerside thereof, a cylinder fixed to the projecting portion of said shaft and disposed vertically above the inner portion of said cutter bar, said cylinder having in its periphery a continuous cam groove to receive said stud, a second shaft journaled in said housing coaxially with the pivotal axis of the latter, a driving shaft flexibly connected to the outer end of said second shaft, gearing in said housing connecting said shafts, and a two-part bearing on said shoe to journal the end of said first shaft projecting beyond said cylinder, said two-part bearing having a fixed lower section and a quick-releasable upper section, which when released permits said cylinder and its shaft to swing upwardly on the pivotal axis of said housing, said quick-releasable section of said two-part bearing being pivoted at one end on said fixed section and having a longitudinal slot at its other end to receive the screw threaded end of a bolt pivoted to said fixed section, said bolt having a wing-nut to fasten said quick-releasable section in operative position.

3. In a mowing machine, a finger bar having a shoe at its inner end and a longitudinal guide-way in its top, said guide-way extending into and transversely of said shoe, a cutter bar reciprocable in said guide-way and having an upstanding stud at its inner end, a gear housing pivotally mounted on said shoe on a forwardly and rearwardly extending horizontal axis, a first shaft journaled in said housing and projecting from the outerside thereof, a cylinder fixed to the projecting portion of said shaft and disposed vertically above the inner portion of said cutter bar, said cylinder having in its periphery a continuous cam groove to receive said stud, a second shaft journaled in said housing coaxially with the pivotal axis of the latter, a driving shaft flexibly connected to the outer end of said second shaft, gearing in said housing connecting said shafts, and a two-part bearing on said shoe to journal the end of said first shaft projecting beyond said cylinder, said two-part bearing having a fixed lower section and a quick-releasable upper section, which when released permits said cylinder and its shaft to swing upwardly on the pivotal axis of said housing, said pivotal mounting of said housing including a journal stud and a journal tube coaxially alined and projecting from said housing, said tubular journal serving as a bearing for said second shaft, and bearings on said shoe for said journal stud and journal tube.

4. The structure of claim 3 in which said journal stud and tube have portions extending beyond the last mentioned bearings for pivotal mounting on the mower.

5. In a mowing machine, a finger bar, a shoe rigidly connected to the inner end of said finger bar, the latter having in its top a longitudinal guide-way which extends into and transversely of the top of said shoe, a cutter bar reciprocable in said guide-way and having an upstanding stud on its inner portion, a gear housing disposed over said shoe and inwardly of the inner end of said guide-way, means mounting said gear housing for vertical swinging movement transversely of said shoe, said mounting means including forwardly and rearwardly spaced bearings on said shoe and coaxially alined journals projecting from opposite sides of said housing and rotatable in said bearings, one of said journals being tubular, a first shaft journaled in said housing and projecting from the outerside thereof, a cylinder fixed to the projecting portion of said shaft and disposed vertically above the inner portion of said cutter bar, said cylinder having in its periphery a continuous cam groove to receive said stud, a second shaft extending through and rotatable in said tubular journal, gearing in said housing connecting said shaft, a drive shaft, a flexible connection between said drive shaft and the end of said second shaft projecting outside of said tubular journal, and a quick-releasable bearing on the outer portion of said shoe to receive the end of said first shaft projecting beyond said cylinder and to releasably hold said grooved cylinder in operative relation to said stud, the release of the last mentioned bearing permitting said cylinder and its shaft to swing upwardly about the pivotal mounting of said housing to facilitate the removal of said cutter bar from the machine.

6. In a mowing machine, a finger bar, a shoe rigidly connected to the inner end of said finger bar, the latter having a longitudinal guide-way which extends into and transversely of said shoe, a cutter bar reciprocable in said guide-way, a first shaft disposed transversely of said shoe and having its outer portion over the inner portion of said cutter bar, driving means between an intermediate portion of said shaft and said cutter bar for reciprocating the latter when the shaft is rotated, said driving means including a cam and a cam follower, one carried by the shaft and the other by the cutter bar, a gear housing member in which the inner end of said shaft is rotatably supported, means pivotally mounting said member on said shoe and including forwardly and rearwardly spaced bearings on said shoe and coaxially alined journals rotatable in said bearings and projecting from opposite sides of said member, one of said journals being tubular, the pivotal mounting of said member permitting the outer end of said shaft to swing upwardly to separate said cam and its follower, a quick-releasable bearing on said shoe for the outer end of said shaft to normally hold said cam and its follower in operative relation, a drive shaft including flexibly connected sections one of which is rotatably supported in said tubular journal and extends into said housing member, and gearing in the latter connecting said shafts.

7. The structure of claim 6 together with means mounting said shoe and cutter bar for vertical swinging on the frame of the mowing machine, said last mentioned means including arms having bearings in which the journals of said gear housing member are rotatably mounted.

DELMER F. SHERMAN.

REFERENCES CITED

The following references are of record in the file of this patent:

UNITED STATES PATENTS

| Number | Name | Date |
|---|---|---|
| 753,697 | Gillaspy | Mar. 1, 1904 |

FOREIGN PATENTS

| Number | Country | Date |
|---|---|---|
| 658,813 | France | Jan. 28, 1929 |